United States Patent
Miller et al.

(10) Patent No.: US 10,746,815 B2
(45) Date of Patent: Aug. 18, 2020

(54) MAGNETIC INTERFERENCE DETECTION AND CORRECTION

(71) Applicant: MICROSOFT TECHNOLOGY LICENSING, LLC, Redmond, WA (US)

(72) Inventors: Quentin Simon Charles Miller, Sammamish, WA (US); Scott Francis Fullam, Palo Alto, CA (US); Lev Cherkashin, Redmond, WA (US); Steven James Velat, Kirkland, WA (US); Simon Skaria, Clyde Hill, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 453 days.

(21) Appl. No.: 15/495,618

(22) Filed: Apr. 24, 2017

(65) Prior Publication Data

US 2018/0180682 A1 Jun. 28, 2018

Related U.S. Application Data

(60) Provisional application No. 62/438,309, filed on Dec. 22, 2016.

(51) Int. Cl.
*G01R 33/00* (2006.01)
*G06F 3/01* (2006.01)
(Continued)

(52) U.S. Cl.
CPC ......... *G01R 33/0029* (2013.01); *G01B 7/003* (2013.01); *G01R 33/0035* (2013.01);
(Continued)

(58) Field of Classification Search
CPC ............ G01R 33/0029; G01R 33/0035; G01B 7/003; G06F 3/011; G06F 3/012;
(Continued)

(56) References Cited

U.S. PATENT DOCUMENTS

| 3,719,882 A | 3/1973 | Pincus |
| 5,767,669 A | 6/1998 | Hansen et al. |

(Continued)

FOREIGN PATENT DOCUMENTS

| WO | 1996018171 A1 | 6/1996 |
| WO | 2014028163 A1 | 2/2014 |
| WO | 2016041088 A1 | 3/2016 |

OTHER PUBLICATIONS

"International Search Report & Written Opinion Issued in PCT Application No. PCT/US2017/066906", dated Jun. 15, 2018, 13 Pages.

(Continued)

*Primary Examiner* — Mohamed Charioui
*Assistant Examiner* — Eyob Hagos
(74) *Attorney, Agent, or Firm* — Workman Nydegger (57) ABSTRACT

A mixed-reality system causes a magnetic transmission device to transmit a magnetic field signal. The mixed-reality system also causes a magnetic-field sensing device to determine a measurement of the magnetic field signal. The mixed-reality system then identifies, using one or more input devices, that a magnetically-interfering object is located within a same environment as both the magnetic transmission device and the magnetic-field sensing device. The mixed-reality system also determines one or more characteristics of magnetic field interference that the magnetically-interfering object is imparting on the magnetic transmission device or the magnetic-field sensing device. The mixed-reality system then computes an adjustment to a pose- (Continued)

estimation model based upon the one or more characteristics of magnetic field interference. The pose-estimation model is used to calculate a pose of at least one of the magnetic transmission device or the magnetic-field sensing device.

20 Claims, 7 Drawing Sheets

(51) Int. Cl.
- *G06F 3/038* (2013.01)
- *G06F 30/20* (2020.01)
- *G01B 7/00* (2006.01)
- *G06F 3/0346* (2013.01)
- *G06F 111/10* (2020.01)

(52) U.S. Cl.
CPC .............. *G06F 3/011* (2013.01); *G06F 3/012* (2013.01); *G06F 3/038* (2013.01); *G06F 3/0346* (2013.01); *G06F 30/20* (2020.01); *G06F 2111/10* (2020.01)

(58) Field of Classification Search
CPC .... G06F 3/0346; G06F 3/038; G06F 17/5009; G06F 2217/16
See application file for complete search history.

(56) References Cited

U.S. PATENT DOCUMENTS

| | | | |
|---|---|---|---|
| 6,172,499 | B1 | 1/2001 | Ashe |
| 6,474,159 | B1 | 11/2002 | Foxlin et al. |
| 7,075,304 | B2 | 7/2006 | Nelson |
| 7,321,228 | B2 | 1/2008 | Govari |
| 7,353,125 | B2 | 4/2008 | Nieminen et al. |
| 9,021,709 | B2 | 5/2015 | Oliver et al. |
| 2002/0186681 | A1* | 12/2002 | Martin ................. H04J 3/0632 370/350 |
| 2009/0284255 | A1 | 11/2009 | Zur |
| 2012/0256954 | A1* | 10/2012 | Soon-Shiong ........ G06T 19/006 345/633 |
| 2013/0200882 | A1 | 8/2013 | Almalki et al. |
| 2013/0249784 | A1 | 9/2013 | Gustafson et al. |
| 2015/0317833 | A1* | 11/2015 | Ebstyne ................ G06T 19/006 345/633 |
| 2017/0262045 | A1* | 9/2017 | Rouvinez .............. G06T 19/006 |
| 2018/0053056 | A1* | 2/2018 | Rabinovich ............ G06F 3/011 |

OTHER PUBLICATIONS

Sabatini, et al., "Quaternion-Based Extended Kalman Filter for Determining Orientation by Inertial and Magnetic Sensing", In Journal of IEEE Transactions on Biomedical Engineering, vol. 53, No. 7, Jul. 2006, pp. 1346-1356.

* cited by examiner

MAGNETIC INTERFERENCE DETECTION AND CORRECTION

CROSS-REFERENCE TO RELATED APPLICATIONS

This application claims priority to and the benefit of U.S. Provisional Application Ser. No. 62/438,309 entitled "Magnetic Interference Detection and Correction", filed on Dec. 22, 2016, which is incorporated by reference herein in its entirety.

BACKGROUND

Computers and computing systems have impacted nearly every aspect of modern living. Computers are generally involved in work, recreation, healthcare, transportation, entertainment, household management, etc.

Mixed-reality computer systems, including virtual-reality systems and augmented-reality systems, have recently received significant interest for their ability to create immersive experiences for users. Conventional augmented-reality systems create an augmented reality scenario by visually presenting virtual objects in the real world. In contrast, conventional virtual-reality systems create a more immersive experience such that a user's entire view is obstructed by a virtual world. As used herein, mixed-reality, augmented-reality, and virtual-reality systems are described and referenced interchangeably. In general, however, "mixed-reality" will be used to broadly describe the various technologies. Unless specifically stated or unless specifically required, as understood by one of skill in the art, the descriptions herein apply equally to any type of mixed-reality system, including augmented-reality systems, virtual-reality systems, and/or any other similar system capable of displaying virtual objects to a user.

Continued advances in hardware capabilities and rendering technologies have greatly increased the realism of virtual objects and scenes displayed to a user within a mixed-reality environment. For example, in mixed-reality environments, virtual objects can be placed within the real world in such a way as to give the impression that the virtual object is part of the real world. As a user moves around within the real world, the mixed-reality environment automatically updates so that the user is provided with the proper perspective and view of the virtual object; this mixed-reality environment is referred to as a scene.

Immersing a user into a mixed-reality environment creates many challenges and difficulties that extend beyond the mere presentation of a scenario to a user. For example, there is significant interest in the field regarding technologies that allow a user to interact with virtual objects in a mixed-reality scenario. Various systems and methods are used to provide this interactive ability to the users. In order to accurately track a user's interactions with their virtual environment, these various systems and methods often need to overcome certain interferences present in an operating environment. Technological solutions that account for this interference would advance the art.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein include systems, computer-readable media, and methods which cause a magnetic transmission device to transmit a magnetic field signal. Disclosed embodiments also cause a magnetic-field sensing device to determine a measurement of the magnetic field signal. Disclosed embodiments then identify, using one or more input devices, that a magnetically-interfering object is located within a same environment as both the magnetic transmission device and the magnetic-field sensing device. The disclosed embodiments also determine one or more characteristics of magnetic field interference that the magnetically-interfering object is imparting on the magnetic transmission device or the magnetic-field sensing device. The Disclosed embodiments then compute an adjustment to a pose-estimation model based upon the one or more characteristics of magnetic field interference. The pose-estimation model is used to calculate a pose of at least one of the magnetic transmission device or the magnetic-field sensing device.

This Summary is provided to introduce a selection of concepts in a simplified form that are further described below in the Detailed Description. This Summary is not intended to identify key features or essential features of the claimed subject matter, not is it intended to be used as an aid in determining the scope of the claimed subject matter.

Additional features and advantages will be set forth in the description that follows, and in part will be obvious from the description, or may be learned by the practice of the teachings contained herein. Features and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION

Embodiments disclosed herein include systems, computer-readable media, and methods that detect and mitigate magnetic interference between the various magnetic sensor devices of a mixed-reality computing system. To that end, in at least one disclosed embodiment, a mixed-reality system causes a magnetic transmission device to transmit a magnetic field signal. The mixed-reality system then causes a magnetic-field sensing device to determine a measurement of that magnetic field signal. The mixed-reality system makes the determination by scanning the environment in which the magnetic-field sensing device is located. For instance, the mixed-reality system will scan the environment using vision, depth, and/or other sensors to locate and identify a foreign object that is also within the same environment. Thereafter, the mixed-reality system determines an amount of magnetic field interference the foreign object is imparting on the magnetic sensors, such as those included in on-body devices. Once this interference is determined, the mixed-reality system computes a pose of at least one of the on-body devices (e.g., a handheld device) in relation to at least one other on-body device (e.g., a head-mounted device). This pose is calculated by calibrating/correcting the measurement of the magnetic field signal to compensate for the determined amount of magnetic field interference.

As used herein, "magnetic-sensor devices" and "on-body devices" are used interchangeably. More specifically, on-body devices are used as examples of magnetic sensor devices that can be configured to perform various embodiments disclosed herein. One will appreciate that the scope of embodiments disclosed herein is not limited to particular forms or devices, but can, instead, be implemented in a variety of different embodiments that extend beyond on-body devices.

Accordingly, the embodiments described herein overcome many deficiencies prevalent throughout the conventional technology. For example, disclosed embodiments provide systems, methods, and apparatuses that mitigate noisy magnetic environments. As such, disclosed embodiments provide greater accuracy in their pose estimations than would otherwise be possible. Further, these embodiments provide for many other substantial benefits that will be described throughout the remainder of this disclosure.

The following discussion may refer to a number of methods and method acts that may be performed. Although the method acts may be discussed in a certain order or illustrated in a flow chart as occurring in a particular order, no particular ordering is required unless specifically stated, or required, because an act is dependent on another act being completed prior to the act being performed.

Figure 1:
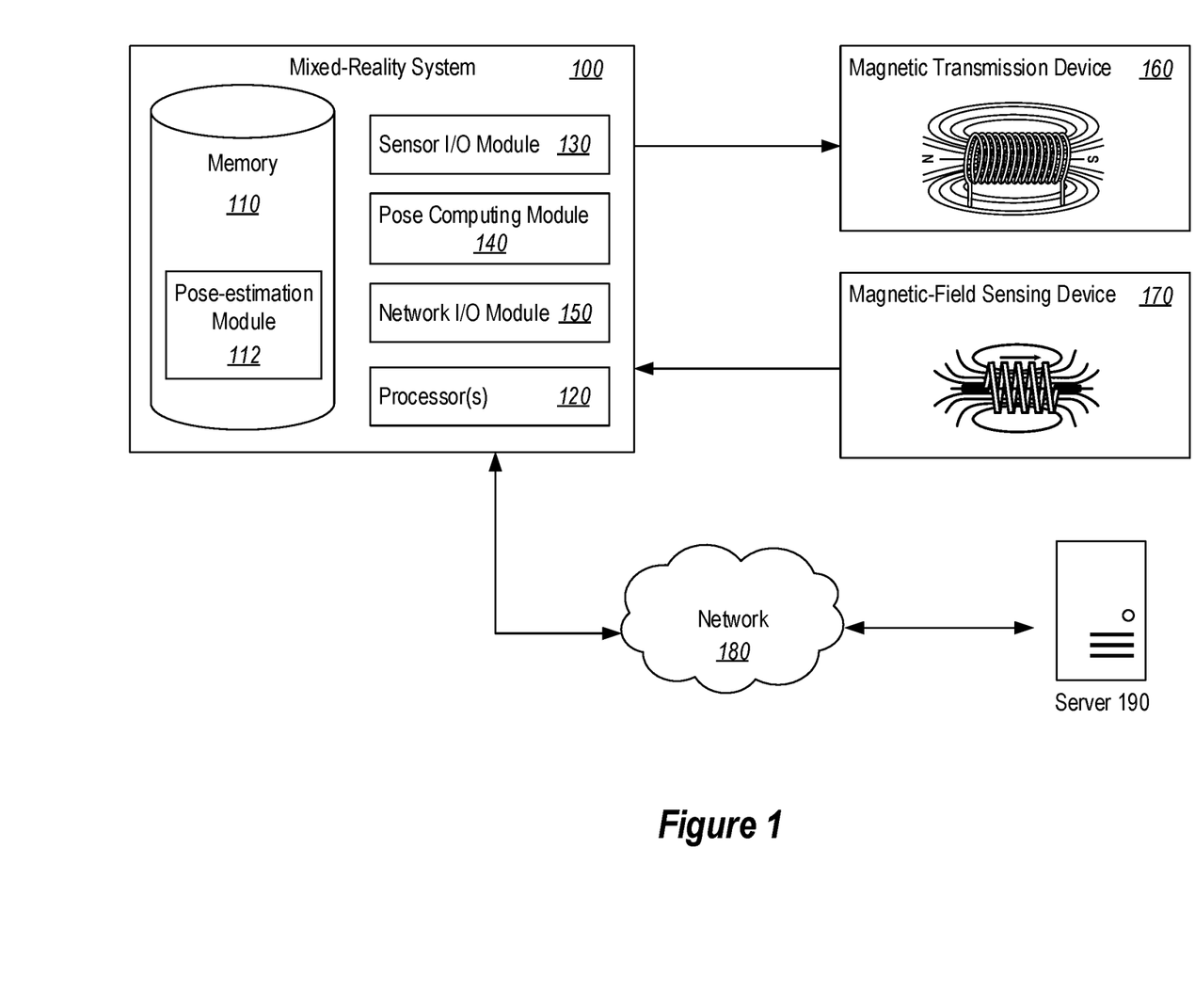
FIG. 1 illustrates a schematic diagram of an embodiment of a mixed-reality system and associated devices.

Initially, FIG. 1 illustrates a schematic diagram of an embodiment of a mixed-reality system 100 that is in communication with a magnetic transmission device 160, a magnetic-field sensing device 170, a network 180, and a server 190. One will appreciate that the various modules, components, and devices shown in FIG. 1 and throughout this application are provided for the sake of example and explanation. In additional or alternate embodiments, the mixed-reality system may include a different combination of modules, components, and devices.

The depicted mixed-reality system 100 includes one or more processor(s) 120 and memory 110. The one or more processor(s) 120 and memory 110 may be representative of hardware components and/or software components. The mixed-reality system 100 also includes a sensor I/O module 130, a pose computing module 140, and a network I/O module 150. In at least one embodiment, the sensor I/O module 130 communicates with one or more input devices that provide sensor information useful for generating a mixed-reality environment. The one or more input devices may comprise pose-estimation sensors that are configured to track a pose of at least one of the magnetic transmission device or the magnetic-field sensing device. For example, the sensor I/O module 130 may communicate with one or more cameras, depth sensors, LIDARs, accelerometers, gyroscopes, sonars, and any other sensors useful within a mixed-reality environment. In the depicted embodiment, the sensor I/O module 130 is in communication with a magnetic transmission device 160 and a magnetic-field sensing device 170.

In at least one embodiment, the magnetic transmission device 160 and the magnetic-field sensing device 170 are used to determine a relative pose of a user within the mixed-reality environment. For example, the magnetic transmission device 160 may be embedded within a mixed-reality headset and the magnetic field sensing device 170 may be embedded within a handheld controller. As the user moves the handheld controller around within the mixed-reality environment, the mixed-reality system 100 causes the magnetic transmission device 160 to transmit a known magnetic field signal. The mixed-reality system 100 also causes the magnetic field sensing device 170, within the handheld controller, to measure variations in the magnetic field signal as the handheld controller is moved between different positions. The magnetic field sensing device 170 communicates these measured variations to the sensor I/O module 130. The pose computing module 140 is then able to determine the relative measured variations.

In various additional or alternative embodiments, the mixed-reality system 100 also utilizes other sensor devices to track the relative pose of the user within the mixed-reality environment. For example, the mixed-reality system 100 may utilize a camera to track the pose of the handheld controller with respect to the mixed-reality headset. For example, whenever the handheld controller is within the field-of-view of the camera, the camera may track specific points (e.g., reflectors) that are placed on the handheld controller. Similarly, the handheld controller may comprise an inertial measurement unit ("IMU") that is able to also provide motion and tracking data relating to the handheld controller. The mixed-reality system 100 is capable of choosing to rely upon a particular sensor for computing pose or to rely upon a combination of multiple sensors to compute pose.

As will be explained more fully below, in at least one embodiment, the network I/O module 150 communicates with the server 190 through a network 180. The network I/O module 150 receives data that is associated with the particular mixed-reality environment that the user is within. For example, the mixed-reality system 100 may receive sensor data from sensors that are embedded within the environment itself. For instance, the mixed-reality environment may be located within a real-world room. Cameras may be attached to the walls and ceilings of the real-world room. The server 190 provides the mixed-reality system 100 with access to the cameras. The pose computing module 140 is then able to utilize the additional data provided by the cameras when computing pose.

In addition to receiving new sensor data from the server 190, in at least one embodiment, the mixed-reality system 100 receives data that describes various forms of interference that may be present within the mixed-reality environment. The mixed-reality system 100 may also receive data that indicates, at least in part, schemes for mitigating the various forms of interference. Additionally, in at least one embodiment, the mixed-reality system 100 also communicates to the server new information about various forms of interference detected by the mixed-reality system 100 and/or schemes for mitigating the various forms of interference.

Figure 2:
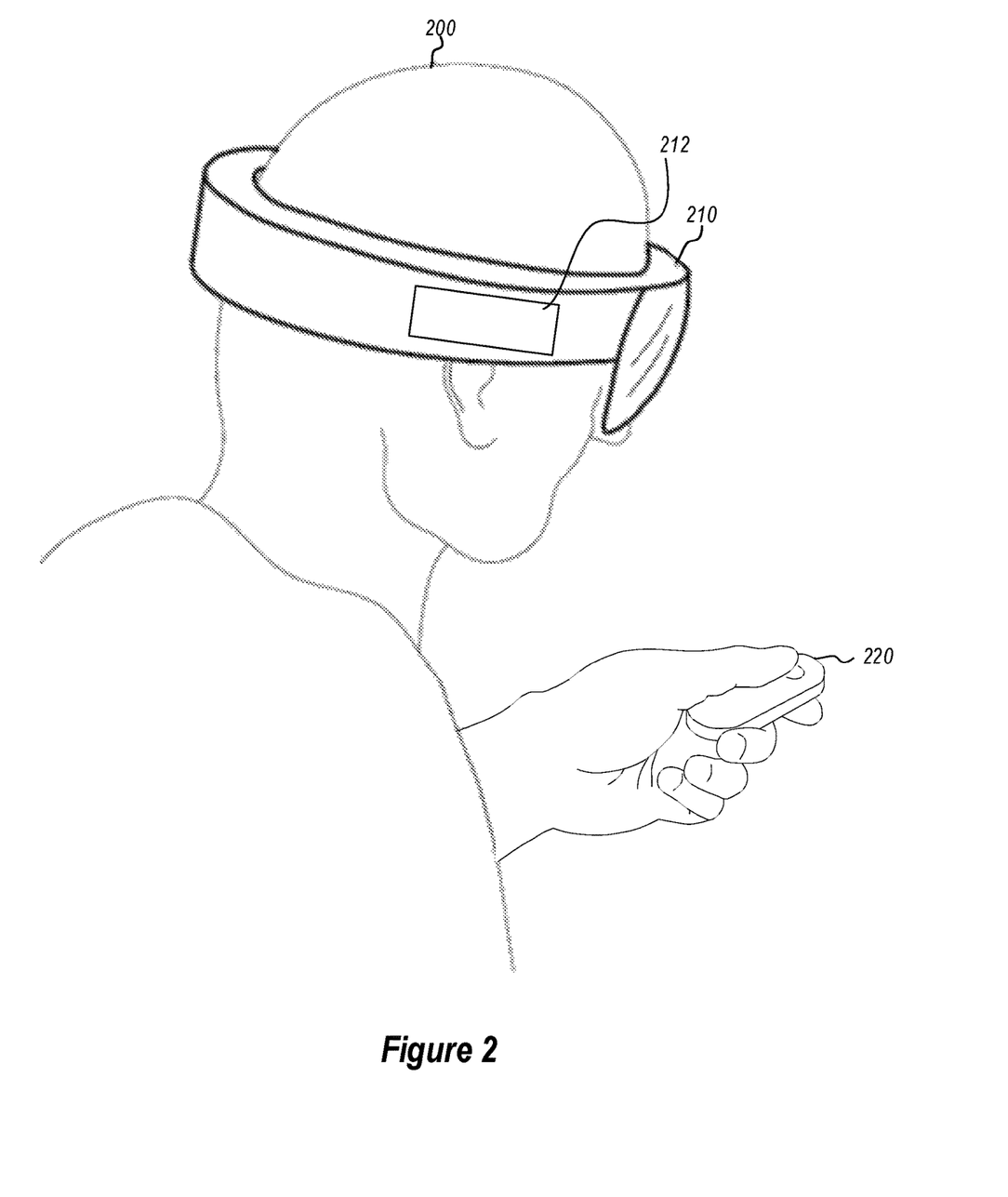
FIG. 2 illustrates an embodiment of mixed-reality devices being used by a user.

FIG. 2 illustrates an embodiment of mixed-reality devices being used by a user 200. The mixed-reality system 100 depicted in FIG. 2 includes a head-mounted display ("HMD") 210 positioned on a user 200. In the depicted embodiment, the HMD 210 includes a mixed-realty system 100 like that described in FIG. 1. Additionally, the HMD 210 includes at least one sensor unit 212 that gathers sensor information relating to the mixed-reality environment. One of skill in the art will recognize that the depicted system can analogously be used within mixed-reality, augmented reality, virtual reality, or any other similar endeavor.

FIG. 2 also depicts a handheld controller 220. Although FIG. 2 illustrates only a single handheld controller 220, embodiments of the present invention are not limited solely to those devices depicted in FIG. 2. For instance, embodiments of the present invention can be configured to simultaneously utilize many on-body devices. Even further, the on-body devices need not merely be handheld or head-mounted. For instance, embodiments of the present invention can be configured to utilize any type of on-body device (e.g., a device mounted on a user's foot, a device mounted on a user's torso, etc.). Additionally, embodiments disclosed herein can also be practiced outside of mixed-reality environments. For example, a user may control a conventional computer using systems, methods, and apparatuses disclosed herein.

The handheld controller 220 may include one or more IMUs. By manipulating the handheld controller 220, the user 200 can interact with the mixed-reality environment and provide user input to the HMD 210. This input can include, for example, controlling and moving virtual objects included within the mixed-reality scenario. A wide variety of user input can be provided. Accordingly, FIG. 2 presents a wearable mixed-reality system 100 that utilizes handheld and head-mounted devices. Together, these devices (i.e. the HMD 210 and the handheld controller 220) enable a user to precisely and rapidly control the mixed-reality computing system.

On-body devices, such as the handheld controller 220 depicted in FIG. 2, can use a magnetic field signal to allow measurement of the pose of the handheld controller 220 with respect to a sensor unit 212 in the HMD 210. In at least one embodiment, the magnetic field signal, the HMD 210, and the handheld controller 220 work in unison to determine how the handheld controller 220 is oriented/situated in relation to the HMD 210 (i.e. its "pose"). Determining the handheld device's pose with respect to the HMD 210 enhances the mixed-reality scenario that is presented to the user 200.

For instance, suppose the mixed-reality computing system 100 presents a scenario in which a user 200 has a virtual object (e.g., a gun, laser, watch, etc.) attached to his/her arm. This scenario may be designed to allow the user 200 to use the virtual object to advance through stages of the scenario (e.g., perhaps the user is to use the gun to fight villains). As a result, the user 200 will move and interact with the images depicted in the scenario. The virtual object should move in unison with the user's movements. Indeed, to provide an enhanced experience, the virtual object should follow the user's specific arm movements. Accordingly, accurate pose positioning of the virtual object (which is accomplished through the communications between the HMD 210 and the handheld controller 220) will better enable the user 200 to advance through the various stages of the scenario.

Figure 3:
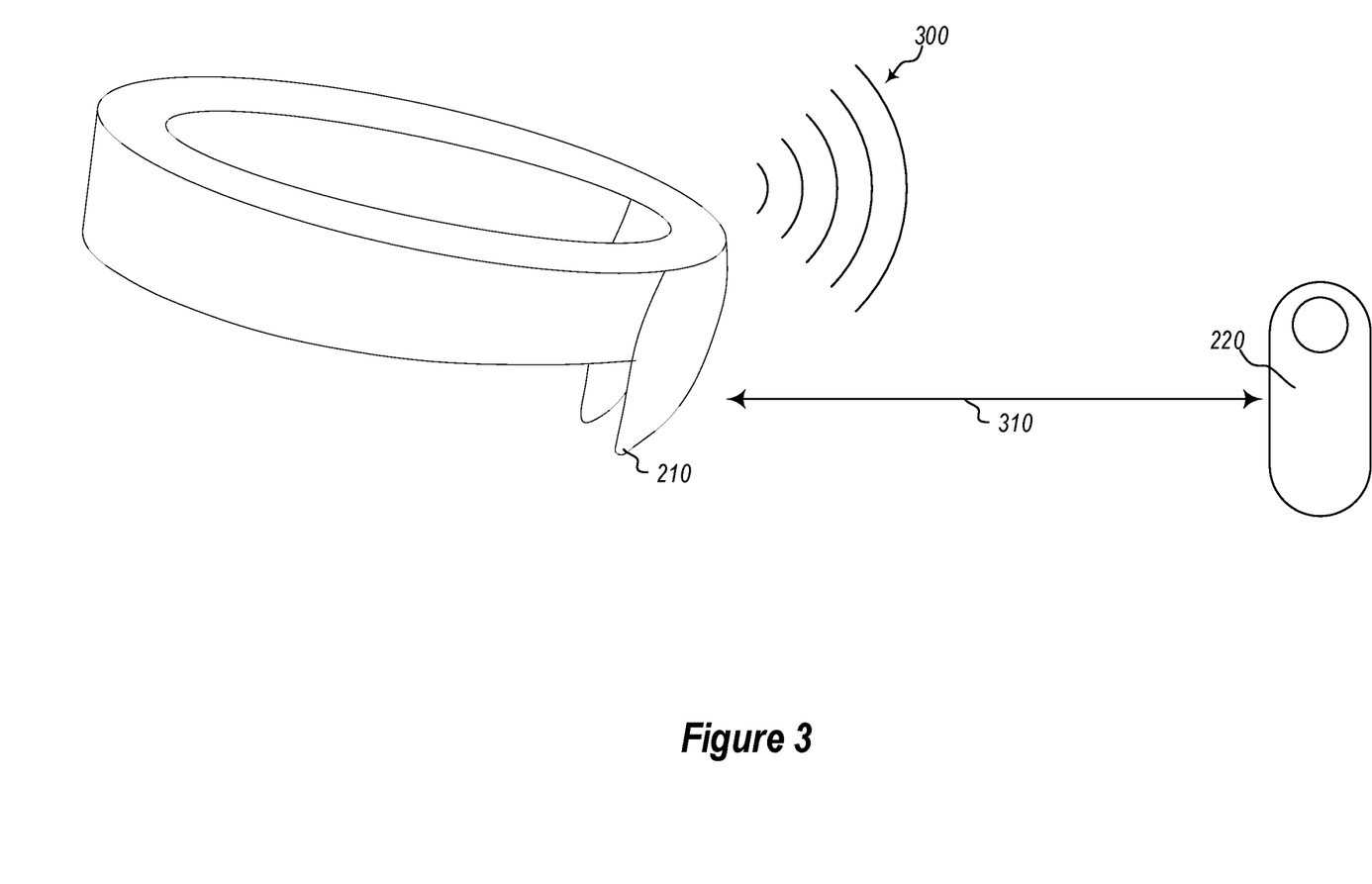
FIG. 3 illustrates a schematic diagram of an embodiment of mixed-reality devices communicating with each other.

FIG. 3 provides a high-level overview of how the mixed-reality computing system determines an on-body device's pose. For instance, FIG. 3 illustrates a schematic diagram of an embodiment of mixed-reality devices communicating with each other. As depicted, the mixed-reality system 100 operates by having at least one of the on-body devices (e.g., the HMD 210) transmit a plurality of magnetic field signals 300. While the HMD 210 is transmitting the magnetic field signal 300, a different device (e.g., the handheld controller 220) will measure the received magnetic field signal. The pose of the on-body device (e.g., the handheld controller 220) can then be computed using the near field fall off relationship and the measured indication from the plurality of magnetic field signals 300.

FIG. 3 also illustrates that a secondary communication channel 310 can be maintained between the two devices. The secondary communication channel 310 is used to communicate data between the two devices and to synchronize other communications between the various devices of the mixed-reality system 100. The secondary communication channel 310 may be different than the channels used to transmit the magnetic field signal. For instance, the secondary communication channel 310 can be in the form of a BLUETOOTH™ channel or other types of wireless communication.

Figure 4:
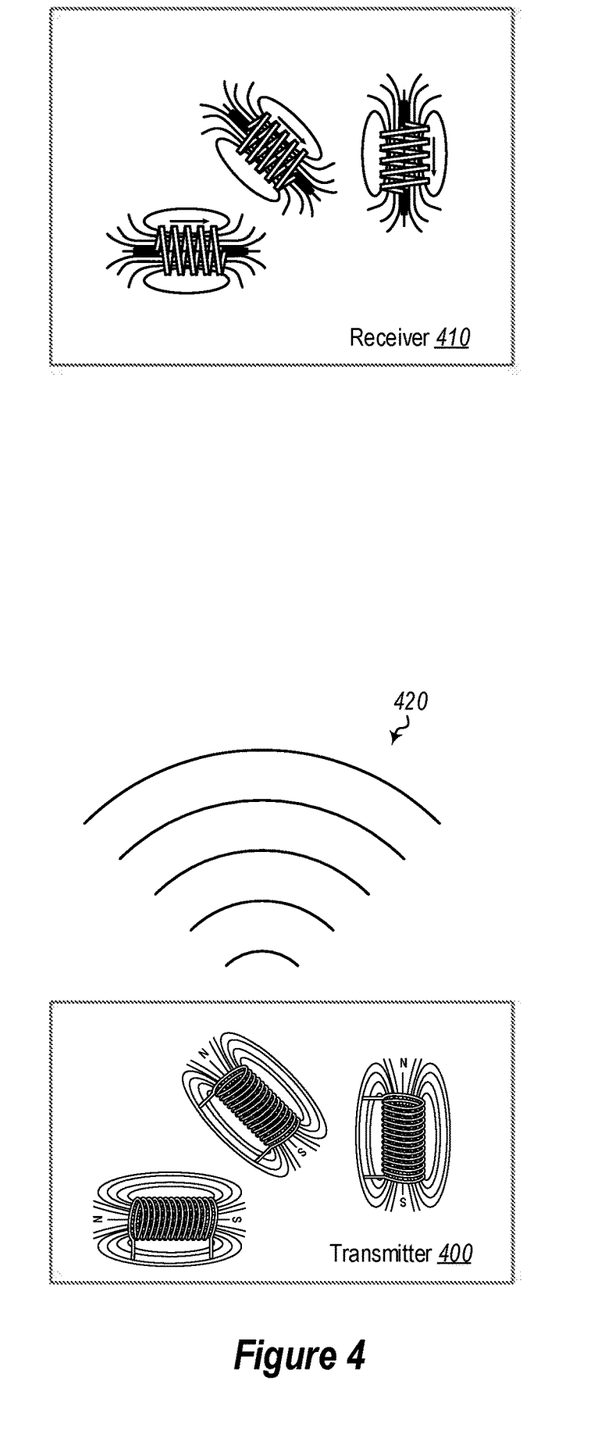
FIG. 4 illustrates a schematic diagram of another embodiment of mixed-reality devices communicating with each other.

FIG. 4 presents an alternative depiction of the devices of a mixed-reality system 100. For instance, FIG. 4 illustrates a schematic diagram of another embodiment of mixed-reality devices communicating with each other. In particular, a transmitter 400 is depicted emitting a magnetic field signal 420 to a receiver 410. The transmitter 400 may be embedded within the magnetic transmission device 160. The receiver 410 may be embedded within the magnetic-field sensing device 170. In at least one additional or alternative embodiment, the magnetic transmission device 160 and/or the magnetic-field sensing device 170 comprises magnetic transceivers that are capable of both emitting and receiving magnetic field signals.

Although not shown in the figures, the HMD 210 (and even the other on-body devices) will include other sensors as well. To illustrate, the HMD 210 can include one or more cameras (e.g., color and/or black and white), depth sensors, infrared sensors, accelerometers, gyroscopes, magnetometers, etc. These other sensors can be used for a variety of reasons. By way of example and not limitation, the sensors of the mixed-reality system 100 can be used to detect objects in an environment in which the system is being operated. Not only can the mixed-reality system 100 use the sensors to detect the objects, the mixed-reality system 100 can also use the sensors in an attempt to identify what those objects actually are.

For instance, suppose the user 200 from FIG. 2 was using the mixed-reality system 100 in a living room. Most living rooms have a variety of objects included therein (e.g., couches, tables, lamps, etc.). Using its sensors, the mixed-reality system 100 detects and identifies those living room objects. Even further, the mixed-reality system 100 can use those objects to develop and present a mixed-reality scenario to the user 200 (e.g., the mixed-reality system 100 can show the couch as being on fire, or a villain breaking through a wall).

As suggested above, the on-body devices (e.g., the handheld controller 220 from FIG. 2) can also include these sensors. As a result, the HMD 210 and the various on-body devices can be used to understand the environment and to create a working model of that environment. Once this model is created, the mixed-reality system 100 tracks the objects and uses the environment to create a better mixed-reality scenario. As indicated before, a depth sensor can be used to understand depth of objects in the environment and can facilitate in the process of identifying what those objects are. Accordingly, using its sensors, a mixed-reality system 100 can generate a working model of an environment and use that model to enhance any mixed-reality scenarios.

Figure 5:
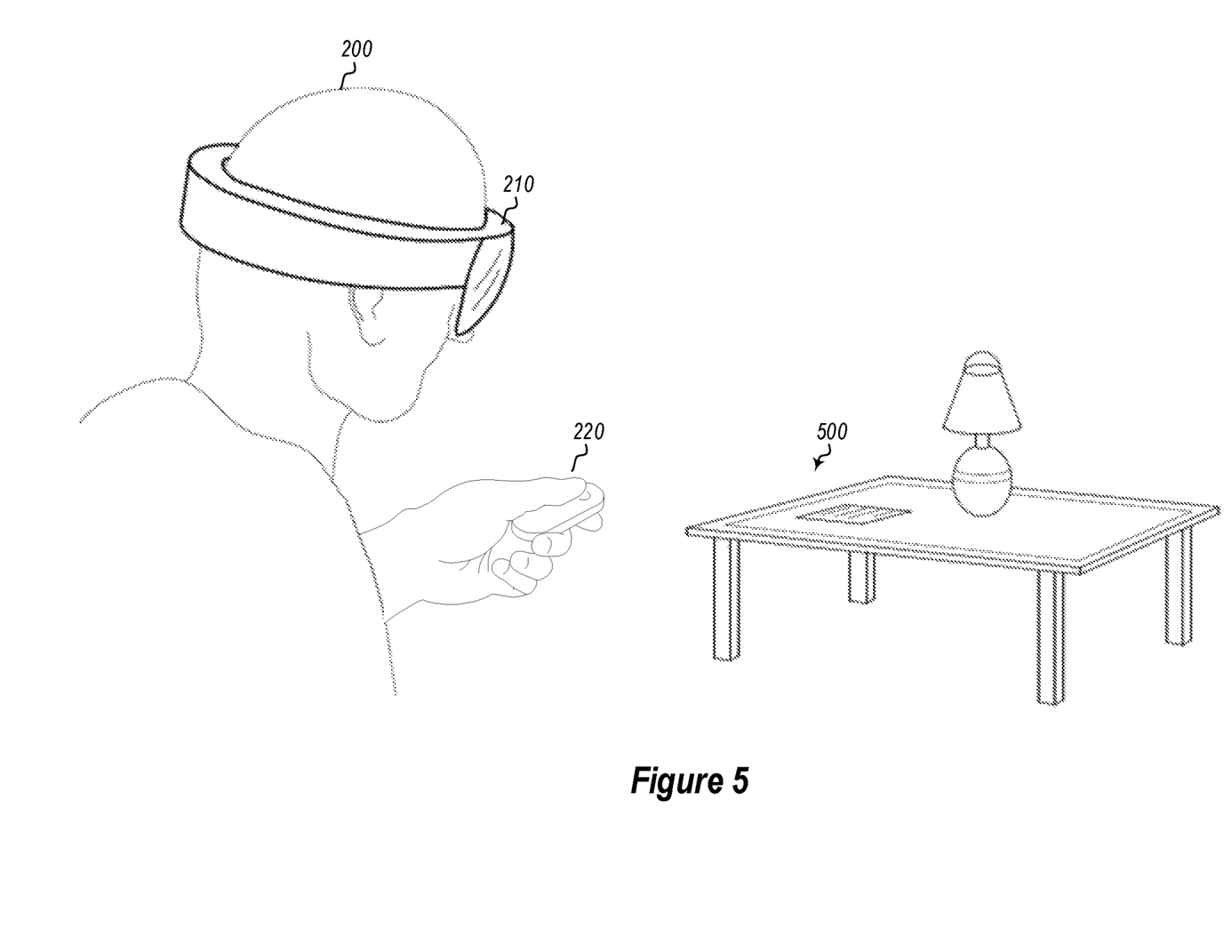
FIG. 5 illustrates a user within an embodiment of a mixed-reality environment.

FIG. 5 illustrates a user 200 within an embodiment of a mixed-reality environment. The mixed-reality environment includes a real-world table 500. Depending on the type of material this table 500 is made of, the table 500 may introduce magnetic interference in the communication between the HMD 210 and the handheld controller 220. For instance, ferrous and other types of conductive metals (and even some electrical systems) can interfere with the magnetic field signal measurements between the HMD 210 and the other on-body devices (e.g., handheld controller 220). This interference may cause the mixed-reality system 100 to calculate an incorrect pose of the handheld device 220 which may then result in a skewed or otherwise incorrect mixed-reality scenario (e.g., because of the interference, the mixed-reality system 100 might show the virtual object on the user's arm as not being in the correct position).

Figure 6:
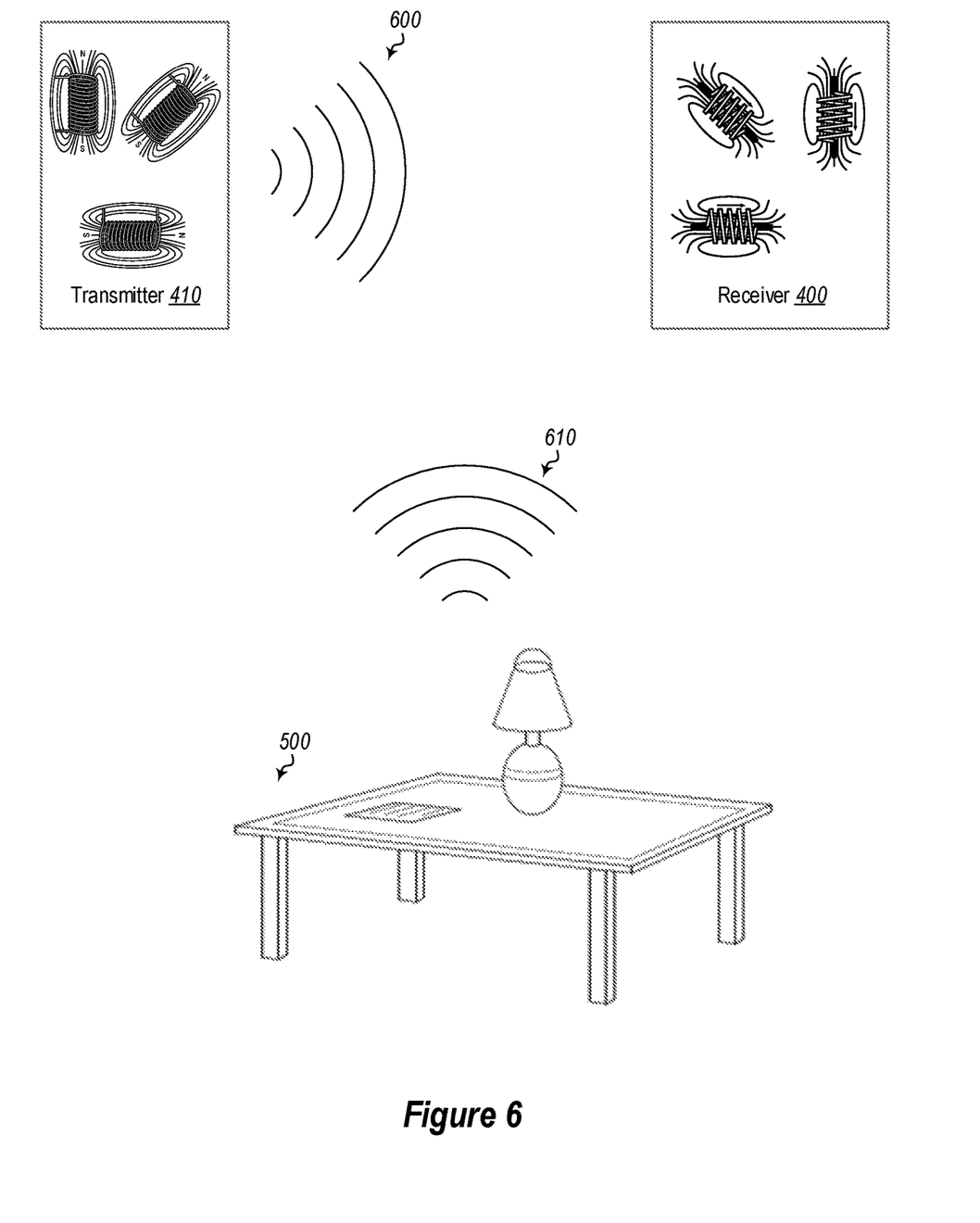
FIG. 6 illustrates an embodiment of a magnetically-interfering object in a mixed-reality environment.

FIG. 6 illustrates an embodiment of a magnetically-interfering object in a mixed-reality environment. In particular, FIG. 6 provides a generalized overview of how magnetically-interfering objects (e.g., the table 500) can introduce interference 610 between a transmitter 410 and a receiver 400. In at least one embodiment, the mixed-reality system 100 is capable of detecting and mitigating magnetic interference caused by magnetically-interfering objects. For example, using the above-mentioned sensors in conjunction with the magnetic transmissions, the mixed-reality computing system 100 can detect and optionally correct for magnetic field interference.

In at least one embodiment, the mixed-reality system 100 can "dual purpose," or rather "re-purpose," the coils of the transmitter 410 (e.g., the magnetic-field signal transmitter in the handheld device 220 or the HMD 210) to passively detect that a magnetically-interfering object (e.g., table 500) is located within the same environment as both the magnetic transmission device 160 and the magnetic-field sensing device 170. For instance, the mixed-reality system 100 periodically causes some (or all) of the coils in a transmitter to be switched to an LC oscillator circuit (or some other equivalent type of system). When acting as an LC circuit, the circuit's resonant frequency shifts in the presence of metal (both ferrous and non-ferrous). The mixed-reality system 100 detects and measures this shift. Based on this shift in resonant frequency, the mixed-reality system 100 detects the presence of a magnetically-interfering object and compensates for that interference 610.

In an additional or alternative embodiment, the mixed-reality system 100 detects that a magnetically-interfering object is located within the same environment as both the magnetic transmission device and the magnetic-field sensing device external magnetic interference by driving of one or more of the transmitting coils with a sine wave. After driving the coils with the sine wave, the mixed-reality computing system 100 will then attempt to detect any resulting eddy currents created within a magnetically-interfering object using one or more of the remaining coils.

Further, in at least one additional or alternative embodiment, the mixed-reality system 100 identifies that the magnetically-interfering object is located within the same environment as both the magnetic transmission device 160 and the magnetic-field sensing device 170 by using a non-magnetic-sensing sensor to identify an estimated first pose of at least one of the magnetic transmission device 160 or the magnetic-field sensing device 170. For example, a camera sensor may estimate a first estimated pose of the magnetic-field sensing device 170. The mixed-reality system 100 then uses a magnetic-sensing sensor to identify an estimated second pose of at least one of the magnetic-field sensing device 170. Based upon the estimated first pose and the estimated second pose not being within a pre-determined threshold of each other, the mixed-reality system 100 identifies that the magnetically-interfering object is located within the same environment as the magnetic-field sensing device 170.

In another additional or alternative embodiment, the mixed-reality system 100 identifies that the magnetically-interfering object is located within a same environment as both the magnetic transmission device 160 and the magnetic-field sensing device 170 by emitting from the magnetic transmission device 160 a first magnetic transmission at a first frequency. The magnetic-field sensing device 170 receives the first magnetic reading of the first magnetic transmission. The magnetic transmission device 160 emits a second magnetic transmission at a second frequency. The magnetic-field sensing device 170 receives a second magnetic reading from the second magnetic transmission. The mixed-reality system 100 then determines that characteristics of the first magnetic reading and characteristics of the second magnetic reading are not within a pre-determined threshold of each other. Based this determination, the mixed-reality system 100 identifies that the magnetically-interfering object is located within the same environment as both the magnetic transmission device 160 and the magnetic-field sensing device 170.

As suggested previously, the mixed-reality system 100 is also able to leverage its vision, depth, and other sensors to generate a real-time schematic-based model of the environment. For example, cameras within the mixed-reality system 100 use image recognition to semantically identify an object, such as the metal table 500, within the environment. Once the table is identified, the mixed-reality system 100 can mitigate the interference caused by the table. For instance, using standard models of interferences (e.g., commonly known interference levels associated with a metal chair or metal table), the mixed-reality system 100 adapts its pose estimation model to account for these estimated and detected interferences.

In at least one embodiment, the mixed-reality system 100 supports an "environmental awareness" aspect. For example, the mixed-reality system 100 detects objects in an environment while the mixed-reality computing system 100 is in an offline mode or in real-time. For example, a user can carry the magnetic-field sensing device 170 through the room. Further, the user can scan the magnetically-interfering object with the magnetic-field sensing device 170. A model of the interference within the room can then be generated. This model can be used to mitigate the interference caused by magnetically-interfering object within the environment. Additionally, this model can be uploaded through the network 180 to the server 190. Once the model is stored in the server 190, future users may download the model and benefit from its information without needing to build the model from scratch.

As such, in various embodiments, the mixed-reality system 100 identifies, using one or more input devices, that a magnetically-interfering object (e.g., the table 500) is located within the same environment as both the magnetic transmission device 160 and the magnetic-field sensing device 170. In addition to identifying the presence of the magnetically-interfering object, the mixed-reality system 100 also determines one or more characteristics of magnetic field interference 610 that the magnetically-interfering object is imparting on the magnetic transmission device 160 and/or the magnetic-field sensing device 170. The one or more characteristics may comprise one or more of the magnetic field signal amplitude, frequency, phase, location data related to the physical location where the measurements are taken, and other related characteristics.

In at least one embodiment, the mixed-reality system computes an adjustment to a pose-estimation model based upon the one or more characteristics of magnetic field interference. The pose-estimation model is used by the pose computing module 140 to calculate a pose of at least one of the magnetic transmission device 160 or the magnetic-field sensing device 170. In at least one embodiment, adjusting the pose-estimation model comprises reducing a confidence weighting associated with values received by the magnetic-field sensing device. For example, upon identifying the presence of a magnetically-interfering object, the pose-estimation module is adjusted by reducing the confidence associated with measurements gathered from the magnetic-field sensing device 170. The pose computing module 140 then relies more heavily upon other sensors, such as cameras, to determine the user's pose. Additionally, in at least one embodiment, the confidence weighting associated with the magnetic-field sensing device 170 is adjusted relative to the magnitude of the magnetic field interference 610 as indicated by the one or more characteristics. For example, higher magnetic field interference 610 causes the mixed-reality system 100 to lower the confidence weighting associated with the magnetic-field sensing device 170.

In an additional or alternative embodiment, adjusting the pose-estimation model comprises calculating an interferer model to compensate for the one or more characteristics of the magnetic field interference 610. Calculating the interferer model may comprise accessing an ideal magnetic field model that describes the magnetic communication between the magnetic transmission device 150 and the magnetic-field sensing device 170 under ideal circumstances. The interferer model is then calculated based upon an analysis of both the ideal magnetic field model and the magnetic field signals being received by the magnetic-field sensing device 170. For example, the interferer model may comprise a mathematical transform that converts the magnetic field signals being received by the magnetic-field sensing device 170 into the ideal magnetic field model. The interferer model is then used to translate the received magnetic field signals into correct pose estimations.

One of skill in the art will understand that the use of an interferer model to adjust the pose-estimation model is provided only for the sake of example. In additional or alternative embodiments, various other means for adjusting the pose-estimation model can be used. For example, the pose-estimation model may be adjusted using a machine-learning system that overtime learns the adjustments. Similarly, the pose-estimation model can be adjusted using information retrieved from other sensors. For example, the magnetic-field sensing device 170 may be viewable within the field-of-view of a camera. Using pose data gathered by the camera, the mixed-reality system 100 can adjust the pose-estimation model to compensate for magnetic interference.

In addition to the above, in at least one embodiment, the mixed-reality system 100 adjusts the pose-estimation model based upon data received from the server 190. For example, the mixed-reality system 100 receives from the server 190 one or more interference variables. The one or more interference variables describe information that was gathered by other devices within the same real-world location. The one or more interference variables describe at least one magnetic characteristic of the magnetically-interfering object. Using the one or more interference variables, the pose computing module 140 computes an adjustment to the pose-estimation model based upon both the one or more characteristics of magnetic field interference 610 gathered by the magnetic-field sensing device 170 and the one or more interference variables.

As such, in at least one embodiment, the mixed-reality system 100 is capable of adjusting the pose-estimation model for a particular physical location without having ever been to that particular physical location. Similarly, upon generating an interferer model or otherwise determining the one or more characteristics of the magnetic field interference 610, the mixed-reality system 100 can upload the data to the server 190. In contrast, in at least one embodiment, multiple mixed-reality systems 100 may be operating within the same physical location. In such a case, the different mixed-reality systems 100 can share data with each other as described herein to assist with magnetic interference mitigation. As such, multiple devices can leverage each other's sensors to adjust their own pose-estimation models to overcome magnetic interference.

Accordingly, by detecting and identifying interferences, the mixed-reality computing system 100 can calculate an accurate pose of each of the various on-body devices. This increase in accuracy will provide a more immersive experience for the user.

Now, an exemplary method of detecting, identifying, and compensating for the various interferences that may impact the mixed-reality computing system's communication will be described with respect to FIG. 7.

Figure 7:
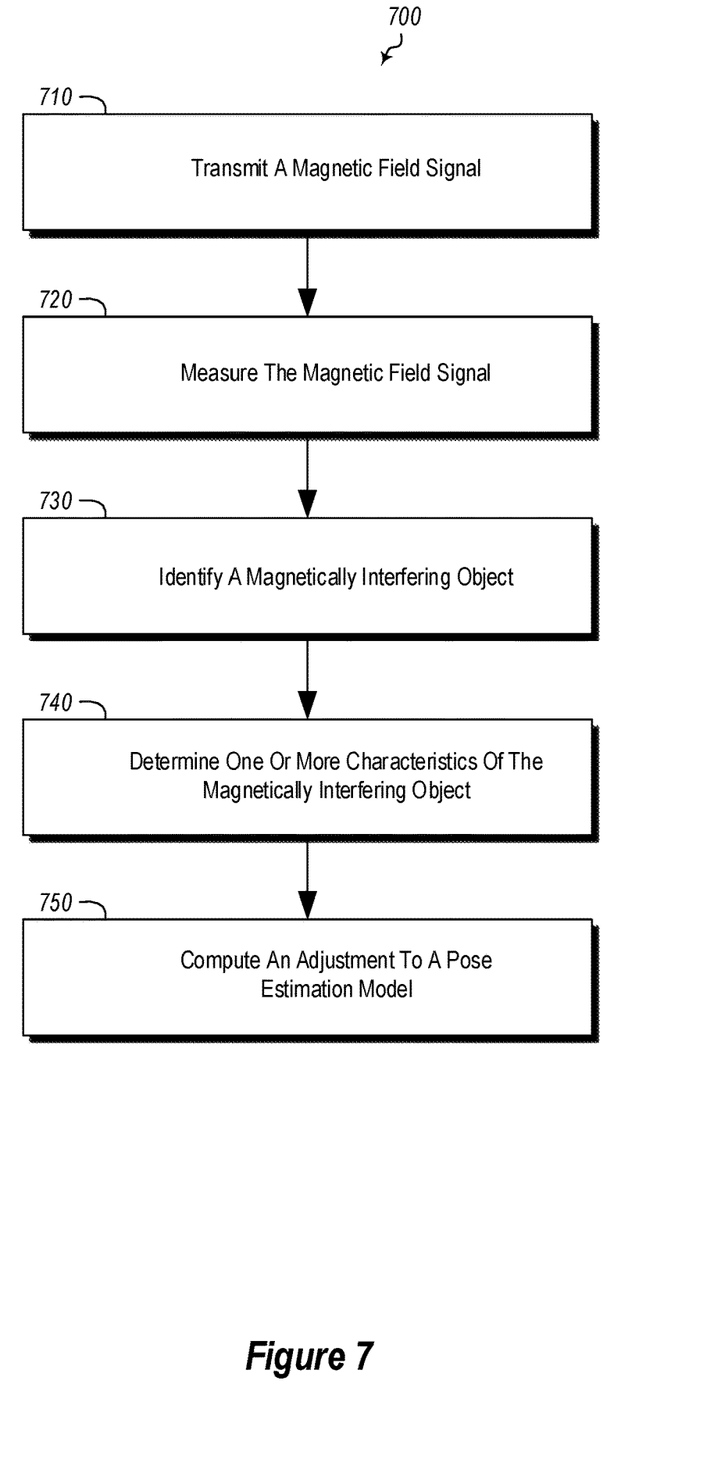
FIG. 7 illustrates steps in an exemplary method that can be followed to detect and compensate for the interference originating from foreign objects.

FIG. 7 presents a method 700 that can be implemented by one or more processors of a computing system. When performed, this method causes the mixed-reality computing system 100 to detect and mitigate magnetic interference that is present in the environment. To that end, at least one of the on-body devices of the mixed-reality computing system 100 (e.g., a handheld controller 220, other on-body devices, or even the HMD 210—all are characterized as being on-body devices) is caused to transmit a magnetic field signal (act 710). This magnetic field signal can be created using a transmitter coil. Notably, multiple signals can be transmitted simultaneously such that a plurality of magnetic field signals may be present.

A different device of the mixed-reality computing system 100 (e.g., a different handheld device (not shown), other on-body devices (also not shown), or the HMD 210 if it was not used to transmit the signal) will then determine a measurement of that transmitted magnetic field signal (act 720). In at least one embodiment, this different device can detect each of the plurality of transmitted signals. Further, this different device will be located within a same environment as the transmitting device.

The method also includes an act 730 in which an object that is located within the same environment as the devices is identified. As discussed previously, this object can be detected in a variety of ways. By way of example and not limitation, the mixed-reality computing system 100 can use its various cameras, depth sensors, infrared sensors, and other sensors to detect and identify the foreign object. Further, the mixed-reality computing system 100 can utilize public information (e.g., the internet) in an attempt to identify and classify characteristics of that object (e.g., the mixed-reality computing system can ascertain common attributes, like magnetic properties, of the identified object by searching the internet).

Then, the method includes an act 740 in which a determination is made regarding one or more characteristics of magnetic field interference that the magnetically-interfering object is imparting on the magnetic transmission device 160 or the magnetic-field sensing device 170. For instance, the mixed-reality computing system 100 can cause one of the transmitter coils of the transmitting device to repurpose itself. By so doing, the repurposed coil can then detect the presence and direction of the interference. This process can be performed on a determined periodic schedule such that the environmental model discussed previously can be kept up to date. By repurposing the coil, the transmitter can act as an LC circuit and can detect resonant frequency shifts. Notably, the receiver coils can also be repurposed to act as transmitters such that the receiver is equally able to detect and identify the magnetic interferences. Other methods of detection are also available and described above. As a result, the data collected from the sensors of the mixed-reality computing system 100 and the data collected from the magnetic field signal can be used to determine how much interference is present.

Once the amount of interference is determined, the method includes an act 750 of computing an adjustment to a pose-estimation model based upon the one or more characteristics of magnetic field interference. The pose-estimation model is used to calculate a pose of at least one of the magnetic transmission device 160 or the magnetic-field sensing device 170. To calculate the adjustment, the mixed-reality system can utilize data from other sensors to adjust the pose-estimation model in view of the interference.

Accordingly, described herein are embodiments related to mixed-reality systems 100, methods, and computer-readable media that provide for precise and rapid control of the system by compensating, calibrating, and/or adjusting a measured signal in response to unwanted interference. The systems may include various components that are configured to perform the processes outlined above. For instance, the system might include a transmitter component that coordinates the transmission of the magnetic field signal. Further, the system might include a receiver component that coordinates the receipt of the magnetic field signal. The system might also include an interference component (which calculates the amount of magnetic interference), an adjustment component (which factors in the measured interference and calibrates/adjusts the data to result in accurate pose data), and a pose determination component (which generates the resulting pose of the various on-body devices).

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Computing system functionality can be enhanced by a computing systems' ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

Interconnection of computing systems has facilitated distributed computing systems, such as so-called "cloud" computing systems. In this description, "cloud computing" may be systems or resources for enabling ubiquitous, convenient, on-demand network access to a shared pool of configurable computing resources (e.g., networks, servers, storage, applications, services, etc.) that can be provisioned and released with reduced management effort or service provider interaction. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Cloud and remote based service applications are prevalent. Such applications are hosted on public and private remote systems such as clouds and usually offer a set of web based services for communicating back and forth with clients.

Many computers are intended to be used by direct user interaction with the computer. As such, computers have input hardware and software user interfaces to facilitate user interaction. For example, a modern general purpose computer may include a keyboard, mouse, touchpad, camera, etc. for allowing a user to input data into the computer. In addition, various software user interfaces may be available.

Examples of software user interfaces include graphical user interfaces, text command line based user interface, function key or hot key user interfaces, and the like. Disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry program code in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system for detecting and mitigating magnetic interference of one or more foreign object(s) detected by the system, the system comprising:

a magnetic transmission device;
a magnetic-field sensing device;
one or more input sensors;
one or more processors; and
one or more computer-readable hardware storage devices having stored thereon executable instructions that are executable by the one or more processors to configure the computer system to perform at least the following:
cause the one or more input sensors to scan an environment in which the system is located and to identify the one or more foreign object(s) that are separate from the system within the environment and that are magnetically-interfering objects;
cause the magnetic transmission device to transmit a magnetic field signal; cause the magnetic-field sensing device to determine a measurement of the magnetic field signal;
determine one or more characteristics of magnetic field interference that the one or more foreign object(s) is imparting on the magnetic transmission device or the magnetic-field sensing device;
generating a pose-estimation model that reflects a relative pose of the magnetic transmission device relative to the magnetic-field sensing device; and
compute an adjustment to the pose-estimation model based upon the one or more characteristics of the magnetic field interference, to mitigate the magnetic field interference when reflecting the relative pose of the magnetic transmission device relative to the magnetic-field sensing device.

2. The system as recited in claim 1, wherein the one or more input devices comprise pose-estimation sensors that are configured to track a pose of at least one of the magnetic transmission device or the magnetic-field sensing device.

3. The system as recited in claim 2, wherein the one or more input devices comprise the magnetic-field sensing device.

4. The system as recited in claim 3, wherein identifying the one or more foreign object(s) comprises:
using a non-magnetic-sensing sensor to identify an estimated first pose of at least one of the magnetic transmission device or the magnetic-field sensing device;
using a magnetic-sensing sensor to identify an estimated second pose of at least one of the magnetic transmission device or the magnetic-field sensing device; and
based upon the estimated first pose and the estimated second pose not being within a threshold of each other, identifying that the magnetically-interfering object is located within the environment with the magnetic transmission device and the magnetic-field sensing device.

5. The system as recited in claim 1, wherein computing the adjustment to the pose-estimation model comprises reducing a confidence weighting associated with values received by the magnetic-field sensing device.

6. The system as recited in claim 1, wherein computing the adjustment to the pose-estimation model comprises calculating an interferer model to compensate for the one or more characteristics of magnetic field interference.

7. The system as recited in claim 1, wherein identifying the one or more foreign object(s) comprises:
emitting from the magnetic transmission device a first magnetic transmission at a first frequency;
receiving a first magnetic reading of the first magnetic transmission;
emitting from the magnetic transmission device a second magnetic transmission at a second frequency;

receiving a second magnetic reading of the second magnetic transmission;
determining that characteristics of the first magnetic reading and characteristics of the second magnetic reading are not within a threshold of each other; and
based upon the characteristics of the first magnetic reading and the characteristics of the second magnetic reading not being within a threshold of each other, identifying that the magnetically-interfering object is located within the environment with the magnetic transmission device and the magnetic-field sensing device.

8. The system as recited in claim 1, wherein computing the adjustment to a pose-estimation model comprises:
receiving from a server one or more interference variables, wherein the one or more interference variables were gathered by other devices and describe at least one magnetic characteristic of the magnetically-interfering object; and
computing an adjustment to a pose-estimation model based upon both the one or more characteristics of magnetic field interference and the one or more interference variables.

9. The system as recited in claim 1, wherein the executable instructions include instructions that are executable to configure the computer system to transmit the adjustment to the pose-estimation model to other computing devices, wherein the adjustment to the pose-estimation model is usable by other devices to calculate a pose of the other devices.

10. The system as recited in claim 1, wherein determining the one or more characteristics of the magnetic field interference comprises scanning the one or more foreign object(s) with the magnetic-field sensing device.

11. A method for detecting and mitigating magnetic interference, the method being performed by one or more processors of a computer system, the method comprising:
causing one or more input sensors to scan an environment in which the computer system is located and to identify one or more foreign object(s) that are separate from the computer system within the environment and that are magnetically-interfering objects;
causing a magnetic transmission device of the computer system to transmit a magnetic field signal;
causing a magnetic-field sensing device of the computer system to determine a measurement of the magnetic field signal;
determining one or more characteristics of magnetic field interference that the one or more foreign object(s) is imparting on the magnetic transmission device or the magnetic-field sensing device;
generating a pose-estimation model that reflects a relative pose of the magnetic transmission device relative to the magnetic-field sensing device; and
computing an adjustment to the pose-estimation model based upon the one or more characteristics of the magnetic field interference to mitigate the magnetic field interference when reflecting the relative pose of the magnetic transmission device relative to the magnetic-field sensing device with the pose-estimation model.

12. The method as recited in claim 11, wherein the magnetic transmission device comprises a first magnetic transceiver device and the magnetic-field sensing device comprises a second magnetic transceiver device.

13. The method as recited in claim 11, wherein the one or more input devices comprise pose-estimation sensors that are configured to track a pose of at least one of the magnetic transmission device or the magnetic-field sensing device.

14. The method as recited in claim 13, wherein identifying the one or more foreign object(s) comprises using a camera sensor and an image recognition classifier to identify the magnetically-interfering object within a frame-of-view of the camera sensor.

15. The method as recited in claim 11, wherein computing the adjustment to the pose-estimation model comprises reducing a confidence weighting associated with values received by the magnetic-field sensing device.

16. The method as recited in claim 11, wherein computing the adjustment to the pose-estimation model comprises calculating an interferer model to compensate for the one or more characteristics of magnetic field interference.

17. The method as recited in claim 11, wherein identifying the one or more foreign object(s) comprises:
emitting from the magnetic transmission device a first magnetic transmission at a first frequency;
receiving a first magnetic reading of the first magnetic transmission;
emitting from the magnetic transmission device a second magnetic transmission at a second frequency;
receiving a second magnetic reading of the second magnetic transmission;
determining that characteristics of the first magnetic reading and characteristics of the second magnetic reading are not within a threshold of each other; and
based upon the characteristics of the first magnetic reading and the characteristics of the second magnetic reading not being within a threshold of each other, identifying that the magnetically-interfering object is located within the environment with the magnetic transmission device and the magnetic-field sensing device.

18. The method as recited in claim 11, wherein identifying the one or more foreign object(s) comprises:
receiving with the magnetic-field sensing device a direct current reading from the same environment; and
based upon the received direct current reading, identifying that the magnetically-interfering object is located within the environment with the magnetic transmission device and the magnetic-field sensing device.

19. The method as recited in claim 11, further comprising transmitting the adjustment to the pose-estimation model to other computing devices, wherein the adjustment to the pose-estimation model is usable by other devices to calculate a pose of the other devices.

20. A computer program product comprising one or more computer-readable hardware storage devices having stored thereon computer-executable instructions that are executable by one or more processors of a computer system to cause the computer system to detect and mitigate magnetic interference by causing the computer system to:
cause one or more input sensors to scan an environment in which the computer system is located and to identify one or more foreign object(s) that are separate from the computer system within the environment and that are magnetically-interfering objects;
cause a magnetic transmission device of the computer system to transmit a magnetic field signal;
cause a magnetic-field sensing device of the computer system to determine a measurement of the magnetic field signal;
determine one or more characteristics of magnetic field interference that the one or more foreign object(s) is imparting on the magnetic transmission device or the magnetic-field sensing device;

generate a pose-estimation model that reflects a relative pose of the magnetic transmission device relative to the magnetic-field sensing device; and compute an adjustment to the pose-estimation model based upon the one or more characteristics of the magnetic field interference to mitigate the magnetic field interference when reflecting the relative pose of the magnetic transmission device relative to the magnetic-field sensing device with the pose-estimation model.

* * * * *